United States Patent
Borowicz et al.

(10) Patent No.: US 7,440,086 B2
(45) Date of Patent: Oct. 21, 2008

(54) METHODS AND SYSTEMS FOR CREATING A RECIPE FOR A DEFECT REVIEW PROCESS

(75) Inventors: S. Mark Borowicz, San Jose, CA (US); Mehran Nasser-Ghodsi, Hamilton, MA (US); Kenneth J. Krzeckzowski, Scotts Valley, CA (US)

(73) Assignee: KLA-Tencor Technologies Corp., Milpitas, CA (US)

( * ) Notice: Subject to any disclaimer, the term of this patent is extended or adjusted under 35 U.S.C. 154(b) by 0 days.

(21) Appl. No.: 11/533,597

(22) Filed: Sep. 20, 2006

(65) Prior Publication Data

US 2007/0067134 A1 Mar. 22, 2007

Related U.S. Application Data

(60) Provisional application No. 60/719,009, filed on Sep. 21, 2005.

(51) Int. Cl.
*G01N 21/00* (2006.01)
(52) U.S. Cl. .................................................... 356/72
(58) Field of Classification Search .................. 356/72; 702/35, 185, 183
See application file for complete search history.

(56) References Cited

U.S. PATENT DOCUMENTS

| | | | |
|---|---|---|---|
| 6,259,960 B1 * | 7/2001 | Inokuchi | 700/110 |
| 7,020,582 B1 * | 3/2006 | Dicosola et al. | 702/185 |
| 2004/0158409 A1 * | 8/2004 | Teshima et al. | 702/22 |

* cited by examiner

*Primary Examiner*—Tarifur R. Chowdhury
*Assistant Examiner*—Isiaka O Akanbi
(74) *Attorney, Agent, or Firm*—Baker & McKenzie LLP

(57) ABSTRACT

Methods and systems for creating a recipe for a defect review process are provided. One method includes determining an identity of a specimen on which the defect review process will be performed. The method also includes identifying inspection results for the specimen based on the identity. In addition, the method includes creating the recipe for the defect review process based on the inspection results. One system includes a sensor configured to generate output responsive to an identity of a specimen on which the defect review process will be performed. The system also includes a processor configured to determine the identity of the specimen using the output, to identify inspection results for the specimen based on the identity, and to create the recipe for the defect review process based on the inspection results.

18 Claims, 1 Drawing Sheet

METHODS AND SYSTEMS FOR CREATING A RECIPE FOR A DEFECT REVIEW PROCESS

PRIORITY CLAIM

This application claims priority to U.S. Provisional Application No. 60/719,009 entitled "Methods and Systems for Creating a Recipe for a Defect Review Process," filed Sep. 21, 2005, which is incorporated by reference as if fully set forth herein.

BACKGROUND OF THE INVENTION

1. Field of the Invention

The present invention generally relates to methods and systems for creating a recipe for a defect review process. Certain embodiments relate to creating a recipe for a defect review process based on inspection results for a specimen.

2. Description of the Related Art

The following description and examples are not admitted to be prior art by virtue of their inclusion in this section.

Inspection processes are used at various times during a semiconductor manufacturing process to detect defects on a specimen such as a reticle and a wafer. Inspection processes have always been an important part of fabricating semiconductor devices such as integrated circuits. However, as the dimensions of semiconductor devices decrease, inspection processes become even more important to the successful manufacture of acceptable semiconductor devices. For instance, as the dimensions of semiconductor devices decrease, detection of defects of decreasing size has become necessary since even relatively small defects may cause unwanted aberrations in the semiconductor devices. Accordingly, much work in the inspection field has been devoted to designing inspection systems that can detect defects having sizes that were previously negligible.

Another important part of yield control is determining the cause of the defects on the wafer or reticle such that the cause of the defects can be corrected to thereby reduce the number of defects on other wafers or reticles. Often, determining the cause of the defects involves identifying the defect type and other characteristics of the defects such as size, shape, composition, etc. Since inspection typically only involves detecting defects on the wafer or reticle and providing limited information about the defects such as location, number, and sometimes size, defect review is often used to determine more information about individual defects than that which can be determined from inspection results. For instance, a defect review tool may be used to revisit defects detected on a wafer or reticle and to examine the defects further in some manner either automatically or manually. Defect review can also be used to verify that defects detected by inspection are actual defects instead of, for example, noise and nuisance events.

Some examples of commonly used defect review tools include high resolution optical imaging systems, scanning electron microscopes and less commonly transmission electron microscopes. The effectiveness of the defect review process is determined, at least in part, by the parameters of the defect review process such as data acquisition parameters and/or data processing parameters. In particular, much like inspection processes, the data acquisition parameters and data processing parameters of a defect review process will have a profound effect on the defect review results. Therefore, it is important that defect review processes be performed with parameters that are suitable for the types of defects being reviewed and/or the type of layer on which the defects are being reviewed.

However, determining the appropriate parameters for defect review can be relatively time consuming and difficult particularly when the defect review tool has a large number of adjustable parameters and/or a large number of different defects are to be reviewed in a single process. In addition, a defect review process recipe is currently created manually by an applications or fab engineer. Therefore, such recipe creation is even more time consuming. For instance, an applications engineer or fab operator decides on the operating parameters for the defect review tool such as a scanning electron microscope (SEM) defect review tool and the inspection results needed to make those decisions. The number of operating parameters that need to be selected for the process may include about 10 or more parameters. Generally, operator time and training involved in setting-up or developing a recipe on a SEM defect review tool is no less than 20 minutes per recipe for the customer (e.g., on average more than 20 minutes per recipe, with recipe set up times varying from about 15 minutes for a relatively easy layer to several hours for a difficult layer).

Some foundries produce more than 300 recipes a year for an inspection tool (e.g., a brightfield optical inspection tool). Each of the 300 recipes may be designed for a particular wafer type and a particular layer of each wafer type. In turn, defects detected on each of those layers need to be reviewed, and each layer requires a different defect review process thereby resulting in more than 300 defect review process recipes needed each year. Manual recipe creation for such a number of defect review processes requires more than 100 hours of recipe setup time in a single year for the SEM defect review tool alone. Therefore, recipe setup by fab operators significantly reduces valuable time during which the operators could be solving problems or performing other yield-related functions.

Furthermore, once a defect review process recipe is created, the applications engineer or fab operator can save the manually selected parameters for the process. The applications engineer or fab operator also saves the process parameters with the name of the layer type that they were created to be used upon. For instance, the recipe for a layer formed of copper (Cu) after a chemical mechanical polishing (CMP) process may be saved as the Cu-CMP recipe. In addition, a recipe for a specific layer type must be manually selected by a process operator on the defect review tool for every lot or batch of specimens run for that layer type (on a wafer or reticle). Therefore, this operator needs to know the recipe name for the specific layer type; otherwise, an incorrect recipe selected by the operator will not find the inspected defects and defect review will not be performed successfully.

Accordingly, it may be advantageous to develop methods and systems for creating a recipe for a defect review process automatically without human interaction/intervention for all of the different types of specimens on which defect review is to be performed thereby providing quicker recipe creation, increased throughput and productivity, higher profits, lower probability for human error, and more effective defect review process recipes.

SUMMARY OF THE INVENTION

The following description of various embodiments of methods, carrier media, and systems is not to be construed in any way as limiting the subject matter of the appended claims.

One embodiment relates to a computer-implemented method for creating a recipe for a defect review process. The method includes determining an identity of a specimen on which the defect review process will be performed. The method also includes identifying inspection results for the specimen based on the identity. In addition, the method includes creating the recipe for the defect review process based on the inspection results.

In a preferred embodiment, the method is performed without input from a user. In another embodiment, the method is automated. In some embodiments, the method includes detecting when a carrier containing the specimen has been loaded into a defect review tool and performing the method after the carrier is detected. In an additional embodiment, determining the identity of the specimen includes reading a bar code on a carrier containing the specimen.

In an embodiment, creating the recipe includes determining one or more parameters of the defect review process using the inspection results and a look up table. In another embodiment, the method includes storing the recipe such that the recipe can be used for additional specimens having a layer type that is the same as a layer type of the specimen on which the defect review process will be performed.

In some embodiments, the inspection results were generated by an optical inspection tool, and the defect review process will be performed by a scanning electron microscope. In other embodiments, the inspection results were generated by an electron beam based inspection tool, and the defect review process will be performed by a scanning electron microscope. Each of the embodiments of the method described above may include any other step(s) described herein.

Another embodiment relates to a carrier medium that includes program instructions that are executable on a processor for performing a method for creating a recipe for a defect review process. The method includes determining an identity of a specimen on which the defect review process will be performed. The method also includes identifying inspection results for the specimen based on the identity. In addition, the method includes creating the recipe for the defect review process based on the inspection results. The carrier medium may be further configured as described herein.

An additional embodiment relates to a system configured to create a recipe for a defect review process. The system includes a sensor configured to generate output responsive to an identity of a specimen on which the defect review process will be performed. The system also includes a processor that is configured to determine the identity of the specimen using the output. The processor is also configured to identify inspection results for the specimen based on the identity. In addition, the processor is configured to create the recipe for the defect review process based on the inspection results.

In one embodiment, the sensor is coupled to a load port of a defect review tool that will perform the defect review process. In another embodiment, the system includes an additional sensor that is configured to detect when a carrier containing the specimen is positioned in a load port of a defect review tool. In such an embodiment, the sensor is configured to generate the output when the carrier is detected. In some embodiments, the sensor includes a bar code reader.

In an embodiment, the processor is coupled to a defect review subsystem such that the processor and the defect review subsystem are configured as a defect review tool. In another embodiment, the processor is configured to access the inspection results from a database. In a different embodiment, the processor is coupled to an inspection tool such that the processor can access the inspection results from the inspection tool.

In an additional embodiment, the processor is configured to create the recipe without input from a user. In some embodiments, the system includes a storage medium that includes a look up table. The look up table includes parameters for the defect review process versus content of the inspection results. In another embodiment, the processor is configured to store the recipe in a storage medium such that the recipe can be used for additional specimens having a layer type that is the same as a layer type of the specimen on which the defect review process will be performed.

In one embodiment, the inspection results were generated by an optical inspection tool, and a defect review tool that will perform the defect review process is configured as a scanning electron microscope. In a different embodiment, the inspection results were generated by an electron beam based inspection tool, and a defect review tool that will perform the defect review process is configured as a scanning electron microscope. Each of the embodiments of the system described above may be further configured as described herein.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 1:
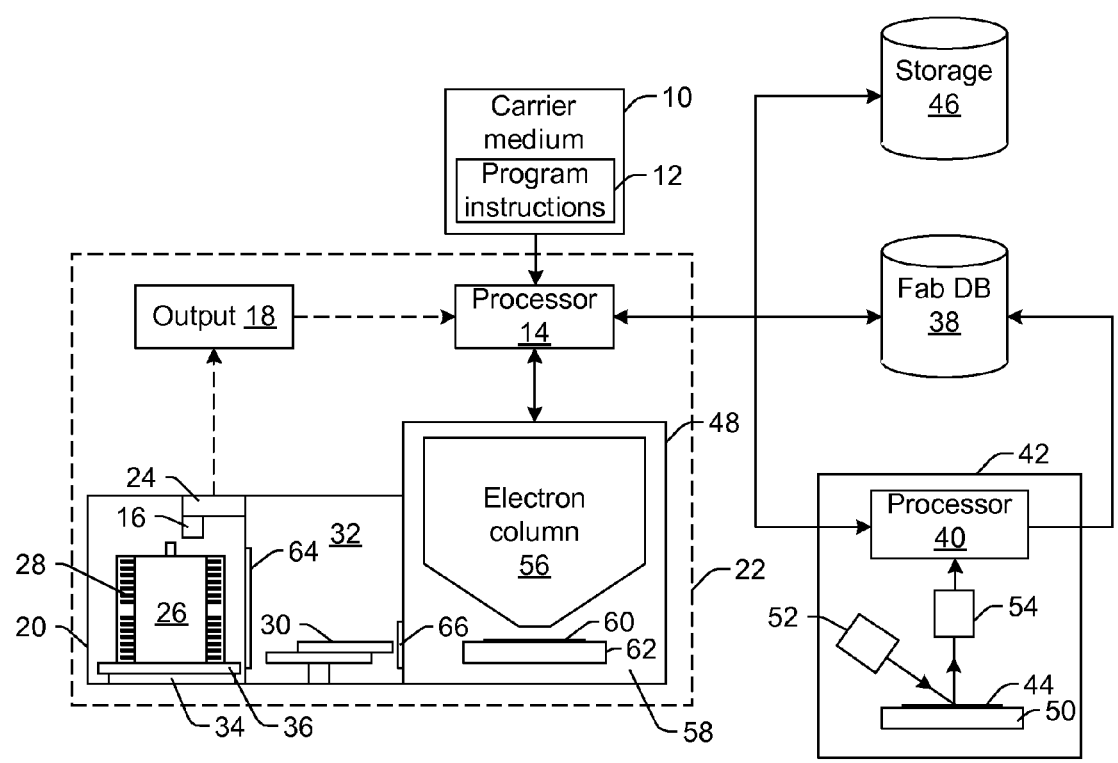
FIG. 1 is a schematic diagram illustrating various embodiments of a carrier medium and a system configured to create a recipe for a defect review process.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As used herein, the term "specimen" refers to a reticle or a wafer. The terms "reticle" and "mask" are used interchangeably herein. A reticle generally includes a transparent substrate such as glass, borosilicate glass, and fused silica having opaque regions formed thereon in a pattern. The opaque regions may be replaced by regions etched into the transparent substrate. Many different types of reticles are known in the art, and the term reticle as used herein is intended to encompass all types of reticles.

As used herein, the term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities. A wafer may include one or more layers formed upon a substrate. For example, such layers may include, but are not limited to, a resist, a dielectric material, and a conductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features. Formation and processing of such layers of material may ultimately result in completed devices. Many different types of devices may be formed on a wafer, and the term wafer as used herein is intended to encompass a wafer on which any type of device known in the art is being fabricated.

The term "recipe" as used herein refers to a set of instructions for carrying out a process on a specimen.

One embodiment of a method for creating a recipe for a defect review process includes determining an identity of a specimen on which the defect review process will be performed. The method also includes identifying inspection results for the specimen based on the identity. In addition, the method includes creating the recipe for the defect review process based on the inspection results.

In one embodiment, the method described above is performed without input from a user. In other words, the method is performed without human interaction or intervention. In this manner, the method selects all of the parameters for the recipe as described further herein. In addition, in some embodiments, the method is automated. Such a method is highly valuable in that it can be used in a fully automated semiconductor fabrication facility, which is commonly referred to as a fab. For instance, in the methods described herein, an operator would not have to access the defect review tool for recipe creation, recipe selection, or recipe running.

As described further herein, the method can be performed by a processor of a defect review tool. In this manner, the method can be performed by the defect review tool itself. However, in other instances, the method can be performed by a processor that is not itself part of a defect review tool. Such a processor may be coupled to the defect review tool (e.g., coupled to a processor of the defect review tool by a transmission medium) such that the processor can provide the recipe to the defect review tool.

In some embodiments, the method includes detecting when a carrier containing the specimen has been loaded into a defect review tool and performing the method after the carrier is detected. The carrier may be, for example, a wafer cassette, a pod, or any other suitable wafer or reticle carrier known in the art. The method may detect that a carrier has been loaded into a defect review tool by monitoring a sensor coupled to a load port of the defect review tool. In this manner, the method may be performed automatically once a carrier containing a specimen on which defects are to be reviewed is loaded into the defect review tool. As such, the defect review process recipe may not exist until a specimen is ready for defect review (e.g., after inspection of the specimen).

In an additional embodiment, determining the identity of the specimen includes reading a bar code on a carrier containing the specimen. For example, like many other industries, bar codes have become common identifiers on specimen carriers in the fab to help keep track of the status of different specimens. The bar codes may be assigned to the carrier (and therefore the specimens in the carrier) when the fabrication process begins on the specimens. In this manner, the specimens may be located in the same carrier throughout the fabrication process such that their progress can be tracked. As such, the methods described herein can take advantage of such an identifier on the carrier to determine the identity of the specimen that is to be processed by the defect review tool. However, any other carrier identifier or specimen identifier may be used by the methods described herein to determine the identity of the specimen. For example, the method may include determining the identity of the specimen from an identifying mark on the specimen itself. Such identifying marks may include, for example, a set of alphanumeric characters inscribed on a wafer or a bar code inscribed on the wafer.

Once the identity of the specimen to be processed by the defect review tool has been determined, the inspection results for the specimen can be identified. For instance, prior to defect review, inspection is performed. Defect review is then performed to generate additional information about specific defects detected by inspection. In addition, the inspection tool that performed the inspection process may associate the specimen identity with the results of the inspection. For example, the specimen identity or carrier identity of the carrier in which the specimen is contained may be read by the inspection tool and stored in a field of the file containing the inspection results. The inspection tool may determine the identity of the specimen as described above. In this manner, the method, after determining the specimen identity, may include searching a storage medium for inspection results associated with the same specimen identity. The storage medium that is searched by the method may include, for example, a fab database, a storage medium coupled to the inspection tool, or any other storage medium in which the inspection results for different specimens can be stored.

The inspection results may be in the form of a KLA Result File (KLARF) or any other file format that can be created and read by multiple differently configured tools. A KLARF file may include all or some of the following information:

File Version, which is the version number of the file and may include the major release number and the minor release number;

File Time Stamp, which includes the creation date and time of the file;

Tiff Spec, which specifies the TIFF version for the TIFF files referenced in the file, the TIFF class used for alignment images, and the TIFF class used for defect images;

Inspection Station ID, which identifies the inspection station that produced the results file and may include name of equipment manufacturer, model, and unique equipment ID;

Sample Type, which includes descriptive text indicating the type of specimen inspected;

Sample Size, which indicates the shape of the specimen and one or more dimensions of the specimen (e.g., diameter, or length and width);

Results ID, which identifies the results data on the inspector;

Result Time Stamp, which includes the date and time of the inspection that produced these results;

Lot ID, which includes the user name for the lot;

Setup ID, which identifies the setup data on the inspector and includes the date and time the setup data was defined;

Step ID, which includes the user name for the process step;

Device ID, which includes the user name for the product being inspected;

Wafer ID, which includes the user name for the specimen (e.g., wafer);

Slot Information, which includes the slot number that the specimen occupied when it was inspected (e.g., the slot in a carrier in which the specimen was located);

Sample Orientation Mark Type, which includes the type of the specimen orientation mark such as notch, flat, text or instructions, where the instructions include instructions on how the specimen was oriented;

Orientation Mark Location, which indicates the direction of the orientation mark with respect to the positive y axis of the specimen coordinate system;

Inspection Orientation, which indicates the direction of the orientation mark with respect to the positive y axis of the specimen coordinate system at the time that the specimen was inspected;

Orientation Instructions, which includes a text string indicating how the specimen was oriented when inspected;

Sample Center Location, which indicates the nominal location of the center of the specimen in the specimen coordinate system;

Tiff File Name, which includes the filename of the TIFF file containing the defect and/or alignment images;

Alignment Points, which includes the alignment mark ID and the coordinates of the alignment point in the specimen coordinate system (e.g., coordinates of the precise point that the user selected when choosing the alignment point);

Alignment Images, which includes the alignment mark ID, coordinates of the origin of the alignment mark image coordinate system in the specimen coordinate system, and the number of the image in the TIFF file containing the alignment image;

Database Alignment Marks, which includes the alignment mark ID, coordinates of the origin of the alignment mark image coordinate system in the database coordinate system, and coordinates of the alignment point in the database coordinate system (where the alignment point is the precise point that the user selected when choosing the alignment mark);

Die Pitch, which includes the distance between corresponding points on adjacent die in the x and y directions;

Die Origin, which includes the coordinates of the lower left corner of die 0,0 in the specimen coordinate system;

Removed Die List, which indicates the location of dice based on the Sample Center Location, the Die Origin, and the Die Pitch that are within the area described by the Sample Size, but which do not exist (dropout dice may be test devices or dice which were not printed at the edge of the specimen);

Sample Test Plan, which indicates the dice sampled in the current test;

Sample Test Reference Plan, which indicates the dice sampled in the current test and the dice that are compared to the sampled dice;

Inspected Area Origin, which indicates the location of the origin of an inspected area on the specimen;

Inspected Area, which includes information for an array of inspected areas such as x and y offsets to lower left corner of inspection area, size of inspected area, repeat count of area, and pitch of the array of the inspected areas;

Area per Test, which includes the total area (e.g., in square microns) inspected per test;

Test Parameters Spec, which specifies the fields that appear in the Test Parameters List such as pixel size, inspection mode, and specimen percentage and the order in which they appear;

Test Parameters List, which includes the values used for the test parameters;

Class Look-up, which specifies the look up table for the defect classification;

Defect Cluster Spec, which specifies the fields for different clustering parameters such as threshold, minimum number of defects in a cluster, and maximum separation between distinct clusters that appear in the Defect Cluster Setup for each specimen and the order in which they appear;

Defect Cluster Setup, which includes the values used for the different clustering parameters;

Defect Record Spec, which specifies the fields that appear in the defect list and the order in which they appear;

Defect List, which includes values in the fields defined in the Defect Record Spec;

Summary Spec, which specifies the fields such as inspection test number, number of defects, defect density, number of die inspected, and number of defective die that appear in the summary list for each specimen and the order in which the appear;

Summary List, which includes values for the fields as set forth in the Summary Spec;

Cluster Classification List, which specifies the classification of particular defect clusters;

Wafer Status, which indicates the status such as passed, failed, or skipped of each specimen handled in inspection;

Lot Status, which indicates for a lot, the number of specimens passed, the number of specimens that failed, and the total number that were inspected; and Defect classification.

The method may also include accessing (e.g., opening or uploading) the inspection results for the specimen such that the inspection results can be used to create the recipe for the defect review process. In some embodiments, creating the recipe includes determining one or more parameters of the defect review process using the inspection results and a look up table. The look up table may include parameters for the defect review process versus content of the inspection results. Such a look up table may be generated manually by an operator (e.g., prior to installation of a system that will perform the method) or automatically by the method. For example, for an electron beam-based defect review process, the look up table may include different layer types that may be formed on the specimen and different electron currents that are suitable for each of the different layer types. In such an example, the method may include determining the layer type of the specimen from the inspection results and determining the electron current that is suitable for the layer type from the look up table. This determined electron current may then be stored as one parameter of the defect review process for the specimen in a recipe. Obviously, a look up table is but one mechanism that can be used to store and determine different parameters that are suitable for different content in different fields in the inspection results, and the methods described herein may use any appropriate mechanism known in the art.

The recipe for the defect review process may include some or all of the following parameters for a scanning electron microscope (SEM) defect review tool: Wafer Rotation (if applicable); Wafer alignment points (optical and electron beam); add/remove test dies; Wafer Tilt (if applicable); SEM Column—Landing Energy; SEM Column—current; SEM Column—extraction current; Automatic Defect Locator (ADL) parameters such as video levels, focusing parameters, initial field of view (FOV); FOV; Acquisition times or frames; Automatic Defect Classification (ADC); Auto-focus; Charge Control; Contrast and brightness settings (if applicable); and Defect sampling. Each of these different parameters may be determined from the inspection results as described above. Obviously, the parameters that are included in the recipe may vary depending on, for example, the configuration of the defect review tool. For instance, the above listed parameters may be suitable for an electron beam-based defect review tool, and a recipe for a different type of defect review tool (e.g., a high resolution optical imaging system) may include a different set of parameters.

Typically, the most difficult problem in defect review is locating the correct defects on the specimen that are selected for review. For example, three coordinate systems are involved in finding the correct defects based on the inspection results: the coordinates within the inspection results file with respect to the specimen, coordinates of the specimen with respect to the stage of the defect review tool (which supports and possibly moves the specimen during defect review), and coordinates of the defect review tool stage. Other differences between the inspection and defect review tools such as FOV differences will also make locating the correct defects on the specimen difficult. However, even revisiting defects on different tools that have substantially the same configuration (e.g., optical inspection tools of the same make and model) will suffer from the difficulties described above.

The important information for correctly revisiting defects is the location of the position on the specimen that the operator or inspection tool selected as the (0,0) coordinates or origin on the specimen at which alignment of the specimen is performed during inspection. Based on the inspection results file, an approximate location of the origin or alignment position on the specimen can be determined. Some SEM defect review tools include an optical subsystem that can be used to generate an optical image (e.g., a low resolution image) at this approximate location. If the specimen has a pattern formed thereon (e.g., a patterned wafer), then the method may include using the approximate location in combination with one or more pattern recognition algorithms to position the optical subsystem above the approximate location on the specimen. The optical subsystem may also be used to perform the pattern recognition.

The optical image may then be processed (e.g., pixilated) to determine a more accurate location of the alignment position within the defect review tool, which then may be imaged by the SEM. Once a SEM image has been acquired, ADL may be performed. In the case of locating a defect, ADL generally includes obtaining an image of a defect with a defect review tool and overlaying that image with an image of the same defect acquired by inspection. Such an image may be obtained from the inspection results described above. The overlaid images may then be subtracted, and a threshold may be used to determine the position of the defect with respect to the defect review tool. In this manner, the defect location accuracy of the defect review process may be about 0.1 µm. A similar process may be used to locate the alignment position on the specimen with respect to the defect review tool. Once the alignment position has been located with high accuracy, defect review may proceed with relatively little error in finding the defects to be reviewed. Each of these steps may be performed automatically by the defect review tool using the inspection results and the recipe created as described herein.

In some embodiments, the method includes storing the recipe such that the recipe can be used for additional specimens having a layer type that is the same as a layer type of the specimen on which the defect review process will be performed. In this manner, when specimens having the same layer type as the specimen for which the defect review process recipe was created are loaded onto the defect review tool, instead of the method being performed again for the additional specimens, the method may include determining if a recipe for the layer type has already been created. In particular, the defect review process recipe may be stored with one or more associated identifiers (e.g., layer type, specimen type, etc.). In this manner, after an identity of a specimen is determined in the method and the inspection results have been identified, the method may include searching in a storage medium containing defect review process recipes that have already been created with one or more identifiers from the inspection results. In general, therefore, a defect review process recipe may be created once for each layer type on each wafer type. The recipes may be stored in any suitable file format known in the art such as a KLARF file. In addition, the recipes may be accessed and used by multiple defect review tools (e.g., defect review tools of the same make and model). In this manner, different specimens of the same type may be processed on different defect review tools without needing to create a new recipe for each tool.

Inspection and defect review of a specimen are typically performed by different tools, both of which are optimized for the type of process that they perform. In this manner, in the methods described herein, the inspection may be performed by a first tool, and the defect review may be performed by a second tool. The first and second tools may have the same general configuration (e.g., optical or electron beam based) or may have different configurations (e.g., optical and electron beam based). For example, in one embodiment, the inspection results have been generated by an optical inspection tool while the defect review process will be performed by a SEM. In a different embodiment, the inspection results have been generated by an electron beam based inspection tool while the defect review process will be performed by a SEM.

According to methods described herein, therefore, in one embodiment, the defect review tool (e.g., a SEM defect review tool) may read the bar code on a carrier (e.g., cassette) or a specimen (e.g., a wafer), make the appropriate decisions for one or more parameters (e.g., the operating conditions) of the defect review tool including, for example, alignment of the specimen, all image grabs (ADL), rough classification of the defects (ADC), etc., and then place all of the information in a designated file location.

After creation of a recipe, the method may include performing the defect review process on the specimen according to the recipe. The defect review process may be performed automatically by the method. Once the defect review process results have been acquired, the method may include altering the recipe based on the results. For example, the method may include determining the defect re-detection rates of the defect review process recipe and comparing the re-detection rates of the recipe to expected re-detection rates (e.g., re-detection rates less than 100% may be expected based on the accuracy of the inspection tool for filtering nuisance defects from the inspection results). If the re-detection rates are lower than the expected re-detection rates, then the method may include determining if the re-detection rates can be increased by changing one or more parameters of the recipe such as FOV, contrast/brightness, column mode parameters, focusing, acquisition times, etc. Additional characteristics of the defect review results such as image quality and ADC re-detection rates including performance of nuisance defect filtering and template matching defects may also be used to alter the defect review recipe.

The method may also include determining the throughput of the recipe. If the throughput of the recipe is lower than a predetermined value, then the method may include determining if the throughput can be improved by changing one or more parameters of the defect review process such as using auto-focus if not already used, changing acquisition times, etc. Improving the recipe as described above may be performed using any appropriate method, algorithm, and/or data structure known in the art. In addition, such "tuning" or "optimizing" of the created recipe may be performed in a fully automated manner by the methods and systems described herein. Each of the embodiments of the method described above may include any other step(s) described herein.

The methods described herein have a number of advantages over other currently used methods for recipe creation (e.g., manual defect review process recipe creation). For example, with the automated recipe creation described herein, an operator in a fully automated fabrication facility (i.e., a "lights out" fab) such as those currently being designed and/or used for fabrication of devices on 300 mm wafers would not need to handle any information, specimens, recipe creation, and/or inspection or defect review results files (e.g., KLARF files). In addition, no SEM defect review tool in the world today produces its own recipe for a given inspection results file (e.g., KLARF file) and specimen (e.g., wafer) without an operator making strategic decisions on the parameters of the recipe. Furthermore, some foundries produce more than 300 recipes for their inspection tools (e.g., brightfield inspection tools) a year. Each recipe may be used for a different layer and/or specimen type. In turn, those same layers will need to be reviewed on a defect review tool (e.g., a SEM defect review tool), and each layer will require a different defect review process thereby amounting to more than 300 defect review process recipes needed each year. This number of recipes currently requires more than 100 hours of recipe setup time in a year.

Since the methods described herein require no input from a user, the methods described herein would provide a time savings of more than 100 hours of applications engineering per defect review tool per year. Therefore, the methods and systems described herein provide benefits for the owner of the defect review tool such as savings in recipe setup time (net zero time), recipe training time (net zero time), ease of use, increased volume of statistical data, and increased productivity of engineers, all of which lead to higher profits. In addition, the methods described herein provide lower probability for human error due to the elimination of human involvement in the defect review process recipe creation. Furthermore, the methods described herein require virtually no recipe creation time and no recipe queue time. In addition, the methods described herein can be performed while the tool is performing other functions. Therefore, the methods described herein provide increased throughput and productivity of the defect review tool, which in turn leads to higher profits. Moreover, the methods described herein may provide defect review process recipes that are more effective than those that are set up by an operator since the parameter selection performed by an operator is subject to the capabilities and subjective decision making of the operator.

As an alternative to the embodiments of the methods and systems described herein, one tool may be configured to perform both inspection and defect review (one after the other) on the same specimen. In this manner, inspection and defect review can be performed while the specimen is located on the same stage without repositioning the specimen on the stage between inspection and review. Therefore, the main source of error in the defect review process, which is generally the translation of the coordinates of defect locations reported by the inspection system to the coordinates of the defect locations on the specimen as positioned in the defect review tool, would be eliminated. However, this one tool would have to be configured to perform every known inspection and defect review process and/or functionality on the same system and platform. Obviously, such a system would not be cost effective.

Turning now to the drawings, it is noted that the figure is not drawn to scale. In particular, the scale of some of the elements of the figure is greatly exaggerated to emphasize characteristics of the elements.

FIG. 1 illustrates one embodiment of carrier medium 10. Carrier medium 10 includes program instructions 12 executable on processor 14 for performing a method for creating a recipe for a defect review process. The method includes determining an identity of a specimen on which the defect review process will be performed, which may be performed as described above. The method also includes identifying inspection results for the specimen based on the identity, which may be performed as described further above. In addition, the method includes creating the recipe for the defect review process based on the inspection results, which may be performed as described further above. The method for which the program instructions are executable may include any other step(s) described herein.

Program instructions implementing methods such as those described herein may be transmitted over or stored on the carrier medium. The carrier medium may be a transmission medium such as a wire, cable, or wireless transmission link. The carrier medium may also be a storage medium such as a read-only memory, a random access memory, a magnetic or image acquisition disk, or a magnetic tape.

The program instructions may be implemented in any of various ways, including procedure-based techniques, component-based techniques, and/or object-oriented techniques, among others. For example, the program instructions may be implemented using Matlab, Visual Basic, ActiveX controls, C, C++ objects, C#, JavaBeans, Microsoft Foundation Classes ("MFC"), or other technologies or methodologies, as desired.

Processor 14 may be included in a computer system (not shown). The computer system may take various forms, including a personal computer system, mainframe computer system, workstation, image computer or any other device known in the art. In general, the term "computer system" may be broadly defined to encompass any device having one or more processors, which executes instructions from a memory medium.

FIG. 1 also illustrates one embodiment of a system that is configured to create a recipe for a defect review process. The system includes sensor 16 that is configured to generate output 18, which is responsive to an identity of a specimen on which the defect review process will be performed. In one embodiment, sensor 16 is coupled to load port 20 of defect review tool 22 that will perform the defect review process. For example, sensor 16 may be coupled to load port 20 by support 24. Support 24 may contain devices (not shown) that can perform one or more functions in combination with sensor 16. For example, support 24 may include a device that is configured to alter a position of the sensor. The position of the sensor may be altered to locate the sensor above an identifying mark on carrier 26. In addition, the position of the sensor may be altered to bring the identifying mark on carrier 26 into focus for the sensor. In another option, the position of the sensor may be altered such that the sensor can scan across the identifying mark. In addition, or alternatively, the support may include one or more electronic devices coupled to the sensor such as an analog-to-digital converter. The support may include any such appropriate devices known in the art.

As shown in FIG. 1, carrier 26 may be a wafer cassette that contains multiple specimens 28. One or more of the specimens in carrier 26 may be processed in defect review tool 22. In general, the specimens contained within a carrier such as carrier 26 are processed together and are commonly referred to as a "lot" or a batch of specimens. An appropriate carrier for specimens 28 may vary depending on the type of the specimens. For example, different carriers may be used for wafers and reticles. In addition, an appropriate carrier for specimens 28 may vary depending on the configuration of the defect review tool. In particular, an appropriate carrier may vary depending on the configuration of the load port of the defect review tool. In this manner, carrier 26 may include any appropriate carrier known in the art such as a front opening unified pod (FOUP).

The carrier may include any appropriate identifying mark known in the art. For example, one way to distinguish between different carriers is to assign a bar code to the carrier prior to the start of fabrication with the specimens contained within the carrier. In this manner, the bar code can be read at different points in the fabrication process to track the progress of the specimens. Therefore, in some embodiments, sensor 16 includes a bar code reader. However, the carrier may include a different type of identifying mark such as a set of alphanumeric characters that are unique to the carrier. In this manner, the configuration of the sensor may vary depending on the configuration of the identifying marks on the carriers. In general, the sensor may include any optical sensor that can generate output that is responsive to the identifying mark on the carrier.

In other embodiments, however, the sensor may be configured to generate output that is responsive to an identity of the specimen by reading an identifying mark formed on the specimen itself. For example, many specimens that are used in semiconductor fabrication are formed with a relatively permanent identifying mark that can be used to determine the identity of individual specimens within a carrier. Such an identifying mark may include, for example, a set of alphanumeric characters or a bar code that is unique to each of the specimens. Therefore, in some embodiments, the sensor may be positioned within load port 20 such that the identifying mark on the specimens can be read (e.g., when the specimens are being removed from carrier 26 by device 30).

In an alternative embodiment (not shown), such a sensor may be positioned within handling chamber 32. In such embodiments, the sensor may be coupled to device 30 or an interior surface of handling chamber 32. Such an embodiment may be advantageous for generating output that is responsive to an identifying mark on a specimen since the sensor may be used in conjunction with device 30 to locate the identifying mark on the specimen. For example, device 30 may be configured to rotate the specimen until the sensor locates the identifying mark. Device 30 may include any appropriate specimen handler known in the art and may include mechanical and/or robotic components.

In some embodiments, the system includes additional sensor 34 that is configured to detect when carrier 26 containing the specimen is positioned in load port 20 of defect review tool 22. For example, sensor 34 may be coupled to support 36 on which the carrier may be positioned when it is loaded into load port 20. Support 36 may include any appropriate support known in the art. In addition, sensor 34 may include any appropriate sensor known in the art. Such a sensor may detect the presence of carrier 26 in a number of different ways. For example, the sensor may be an optical sensor, a pressure sensor, a mechanical sensor, a hydraulic sensor, etc. Carrier 26 may be positioned in load port 20 of defect review tool 22 in any manner known in the art (e.g., by a fab operator, an applications engineer or automatically (e.g., in the case of a fully automated fabrication facility)).

In such an embodiment, sensor 16 is configured to generate output 18 when carrier 26 is detected by sensor 34. In this manner, the defect review process recipe for one or more specimens in carrier 26 may not be created until the carrier has been loaded into the defect review tool. As such, the defect review process recipe may not be created until it is actually needed. In addition, the creation of the recipe may be performed automatically upon detection of the carrier in the load port. As described further herein, additional steps that are performed to create a defect review process recipe are also automated. As such, the entire process for creation of a defect review process recipe may be automated thereby completely eliminating the need for human input into the recipe creation process. Therefore, the systems described herein have the same advantages of the methods described above.

The system also includes processor 14. Processor 14 is configured to determine the identity of the specimen using output 18. For example, processor 14 may be coupled to sensor 16 or electronic components (not shown) coupled to sensor. Such electronic components may be disposed in support 24 as described further above. The processor may be coupled to the sensor or the electronic components by a transmission medium (not shown). The transmission medium may include any suitable transmission medium known in the art and may include wired and wireless portions. In this manner, processor 14 is configured to receive output 18 from sensor 16. Processor 14 may then use output 18 to determine the identity of the specimen. As described above, the identity of the specimen may be determined from an identifying mark on carrier 26 or the specimen. Processor 14 may be configured to use any algorithm or method to determine the identity of the specimen from the output. For example, the processor may be configured to determine the identity of the specimen using the output and an image processing algorithm.

Processor 14 is also configured to identify inspection results for the specimen based on the identity. For example, processor 14 may search in one or more predetermined locations for an inspection results file that contains the identity of the specimen. In one embodiment, processor 14 is configured to access the inspection results from a database. For instance, as shown in FIG. 1, processor 14 may be coupled to fab database 38 by a transmission medium (not shown) that may be configured as described above. In this manner, processor 14 may receive data from and send data to the fab database. Fab database 38 may include information generated by a number of different process tools (not shown), inspection tools, etc. in the fab. For instance, as shown in FIG. 1, processor 40 of inspection tool 42 may be coupled to fab database 38. In this manner, when inspection tool 42 has inspected specimen 44, the inspection results may be sent from processor 40 to fab database 38. Processor 40 may be coupled to fab database 38 as described above such that processor 40 may receive data from and send data to the fab database. The inspection results may include an identity of the specimen. In this manner, processor 14 may search fab database 38 using the identity of the specimen determined by processor 14 to find inspection results for the specimen.

In an alternative embodiment, processor 14 may be coupled to inspection tool 42 such that processor 14 can access the inspection results for the specimen from the inspection tool. For instance, processor 14 may be coupled to processor 40 of inspection tool 42 or a storage medium (not shown) coupled to processor 40. Processor 14 and processor 40 may be coupled as described above such that data may be sent between the processors. In this manner, processor 14 may be configured to request inspection results for the specimen from processor 40. The request may include the specimen identity determined by processor 14. Alternatively, processor 14 may be configured to access the storage medium coupled to processor 40 in a manner similar to that described above with respect to the fab database. The storage medium may include a database such as that described above for the fab database. However, unlike the fab database, this storage medium may include only information generated by inspection tool 42. In this manner, processor 14 may be configured to search for and access the inspection results for a particular specimen in the storage medium coupled to inspection tool 42.

In any of the above embodiments, the inspection results may be in the form of a KLARF file or any other file format that can be read by multiple differently configured tools. The inspection results may include the information described above. In addition, the inspection results may be transferred from the inspection tool to the defect review tool (e.g., to a storage medium coupled to a processor of the defect review tool) upon completion of the inspection of the specimens. Such file transfer may be performed automatically.

Processor 14 is also configured to create the recipe for the defect review process based on the inspection results. For example, processor 14 may make automated "SMART" decisions about the parameters of the defect review process such as alignment, SEM parameters, image grab, and any other parameters described herein from the information in the inspection results and any other images, files, documents, etc., or some combination thereof attached to the inspection results.

In one such embodiment, the system includes storage medium 46. In such an embodiment, storage medium 46 may include a look up table (not shown). The look up table may include parameters for the defect review process versus content of the inspection results. In this manner, the look up table may contain predetermined parameters that are suitable for a defect review process for a specimen and/or defects on the specimen having characteristics defined in the inspection results. Such a look up table provides a quick and easy method for determining parameters of the defect review process. The look up table may have any suitable configuration known in the art.

However, it is to be understood that any method, algorithm, and/or data structure may be used to determine parameters for the defect review process based on content of the inspection results. For example, in an alternative embodiment, the processor may be configured to use a rules database and the inspection results to determine one or more parameters of the defect review process. The rules database may have any suitable configuration known in the art.

The individual parameters of the defect review process taken together form the recipe for the defect review process. As described above, therefore, the processor is configured to create the recipe without input from a user. In other words, creating the defect review process recipe is performed by the processor without interaction and/or intervention from a human.

In some embodiments, as shown in FIG. 1, processor 14 is coupled to defect review subsystem 48 such that the processor and the defect review subsystem are configured as defect review tool 22. In this manner, the defect review tool itself may create the recipe for the defect review process. In addition, the automatic recipe creation may be performed by the defect review tool itself without human interaction or intervention for all inspected specimens. In some such embodiments, processor 14 may be configured to control defect review subsystem 48 such that the created recipe is carried out by the defect review subsystem.

In other embodiments, however, processor 14 may not be coupled to defect review subsystem 48. In this manner, processor 14 may be configured as part of a "stand-alone" processing system. Although the processing system may be configured as a module that is separate from other systems in the fabrication facility such as defect review tool 22 and inspection tool 42, such a processing system may be coupled to such tools by a transmission medium as described above. Therefore, in such embodiments, processor 14 may be configured to send the created recipe to a processor (not shown) of the defect review tool such that the defect review process recipe may be performed by the defect review tool on a specimen. In any of the above embodiments, the defect review tool may automatically perform the defect review process including steps such as automated defect locating, image grab, defect classification, etc.

In some embodiments, processor 14 is configured to store the recipe in a storage medium such that the recipe can be used for additional specimens having a layer type that is the same as a layer type of the specimen on which the defect review process will be performed. For instance, the layer type may be a copper (Cu) layer after chemical mechanical polishing (CMP). In this manner, the recipe may be stored with the layer type (e.g., Cu-CMP) such that it can be accessed later as described herein. Processor 14 may be configured to store the recipe in storage medium 46, fab database 38, or another storage medium (not shown) coupled to processor 14. Such a storage medium may or may not form part of the defect review tool.

If the processor stores the recipes that it creates, after the processor has determined the identity of the specimen using output 18 from sensor 16, the processor may determine if the layer type of the specimen to be reviewed can be determined from the identity of the specimen. If so, the processor may search in the storage medium for a defect review process recipe for the layer type of the specimen. If the layer type of the specimen to be reviewed cannot be determined from the identity of the specimen, the processor may identify inspection results for the specimen based on the identity. Once the processor has accessed the inspection results for the specimen, the processor may determine the layer type of the specimen to be reviewed from the inspection results. Once the processor has determined the layer type of the specimen, the processor may search the storage medium for a defect review process recipe for the layer type of the specimen. In this manner, prior to creating a defect review process recipe for a specimen, the processor may determine if an appropriate recipe has already been created for another specimen of the same type. As such, the processor may create a recipe for each type of specimen only once.

In some embodiments in which the defect review process recipe is saved in some manner, the processor may use the results of the defect review process performed according to the recipe to alter the recipe that is stored. In this manner, the processor may correct and/or optimize the recipes that it created based on results of those recipes. The recipes may be altered as described further herein. In addition, the processor may use the results of the recipes to alter the methods, algorithms, and/or data structures that are used to create the recipes. In this manner, the processor may use the results to make "smarter" decisions when creating additional recipes. As such, the processor and the manner in which the defect review process recipes are created may be tuned such that more suitable recipes may be created over time. Processor 14 may be configured to perform the steps described above and any other step(s) described herein using program instructions 12 included in carrier medium 10.

In the embodiments described above, the inspection results are generated by one tool while the defect review process is performed by another tool. In addition, the different tools may be similarly or differently configured. For instance, the inspection results may have been generated by an optical inspection tool, and a defect review tool that will perform the defect review process may be configured as a SEM. In an alternative embodiment, the inspection results may have been generated by an electron beam based inspection tool, and a defect review tool that will perform the defect review process is configured as a SEM.

In one embodiment, such tools may be configured as shown in FIG. 1. In particular, inspection tool 42 may be configured as an optical inspection tool. Inspection tool 42 includes stage 50 on which specimen 44 may be disposed during inspection. The stage may include any suitable mechanical or robotic assembly known in the art. Inspection tool 42 also includes light source 52. Light source 52 may include any suitable light source known in the art. Light source 52 may be configured to direct light to specimen 44 at an oblique angle of incidence. Light reflected from specimen 44 may be detected by detector 54. Detector 54 may include any suitable detector known in the art. As shown in FIG. 1, detector 54 may be configured to detect light scattered from the specimen (not specularly reflected light). Therefore, inspection tool 42 is configured as a darkfield inspection tool.

Detector 54 may be coupled to processor 40 such that output (not shown) of detector 54 may be sent to processor 40. Detector 54 may be coupled to processor 40 by a transmission medium (not shown) and/or one or more electronic components (not shown), which may be configured as described above. Therefore, processor 40 may use the output generated by detector 54 to generate the inspection results.

Although one particular configuration of inspection tool 42 is shown in FIG. 1, inspection tool 42 may have any suitable optical configuration known in the art. For example, inspection tool 42 may be configured as a brightfield inspection tool, a brightfield and darkfield inspection tool, a scatterometer, an ellipsometer, a reflectometer, or some combination thereof In other words, inspection tool 42 may be configured to inspect the specimen using any optical technique(s) known in the art. Inspection tool 42 may also include any commercially available optical inspection tool such as the 23xx family of tools and the AIT family of tools, both of which are commercially available from KLA-Tencor, San Jose, Calif.

In addition, the optical inspection tool shown in FIG. 1 may be replaced with an e-beam based inspection tool (not shown) such as a CD SEM and the eS25 and eS30 systems, which are commercially available from KLA-Tencor. Such an inspection system may be included in the system and coupled to other components of the system (e.g., fab database 38 and processor 14) as described above.

One example of a defect review tool that is configured as a SEM is shown in FIG. 1. In this embodiment, defect review tool 22 includes defect review subsystem 48. Defect review subsystem 48 includes electron column 56 disposed within vacuum chamber 58. Electron column 56 may be configured to direct electrons (not shown) to specimen 60 positioned on stage 62. Specimen 60 may be placed on stage 62 by device 30, which may be configured as described above. In particular, door 64 between load port 20 and handling chamber 32 may be opened when a specimen from carrier 26 is to be processed by defect review subsystem 48. In this manner, device 30 may remove the specimen from carrier 26 and move the specimen into handling chamber 32. Door 64 may then be closed. Once the specimen is located within handling chamber 32 and door 64 is closed, a vacuum or purged environment may be created in handling chamber 32. Creating such an environment in the handling chamber creates a smaller disturbance in vacuum environment 58 when the specimen is moved by device 30 from handling chamber 32 through door 66 and onto stage 62.

As shown in FIG. 1, stage 62 may also be positioned within vacuum chamber 58 such that the electrons travel from the electron column to the specimen and vice versa through a vacuum environment. Stage 62 may include any appropriate stage known in the art. The electron column may also be configured to collect electrons from the specimen and to direct the collected electrons to a detector (not shown). Electron column 56 and the SEM formed by electron column 56 may have any suitable configuration known in the art.

If processor 14 is a part of the defect review tool as shown in FIG. 1, the detector of electron column 56 may be coupled to processor 14 such that processor 14 can receive output from the detector. Processor 14 may use the output to generate defect review results for specimen 60. For instance, processor 14 may use the output to generate images of the defects on specimen 60. In addition, processor 14 may use the output to determine one or more characteristics of the defects on the specimen such as size, roughness, shape, classification, root cause, etc. Processor 14 may also be configured to perform any other defect review related functions known in the art. Processor 14 may be configured to use the output and any suitable method and/or algorithm known in the art to determine the one or more characteristics and/or perform any other defect review related functions. Each of the embodiments of the system described above may be further configured as described herein.

Further modifications and alternative embodiments of various aspects of the invention may be apparent to those skilled in the art in view of this description. For example, methods and systems for creating a recipe for a defect review process are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for creating a recipe for a defect review process, comprising:

determining an identity of a specimen on which the defect review process will be performed;

identifying inspection results for the specimen based on the identity, wherein the inspection results have been generated by a first tool;

determining if a recipe for the defect review process for a layer type of the specimen has been created based on the inspection results;

if the recipe for the layer type of the specimen has not been created, creating the recipe for the defect review process based on the inspection results without input from a user, wherein the defect review process will be performed by a second tool, and wherein the second tool comprises a defect review tool; and storing the recipe such that the recipe can be used for additional specimens having a layer type that is the same as the layer type of the specimen on which the defect review process will be performed.

2. The method of claim 1, wherein the method is automated.

3. The method of claim 1, further comprising detecting when a carrier containing the specimen has been loaded into the defect review tool and performing the method after said detecting.

4. The method of claim 1, wherein said determining the identity comprises reading a bar code on a carrier containing the specimen.

5. The method of claim 1, wherein said creating comprises determining one or more parameters of the defect review process using the inspection results and a look up table.

6. The method of claim 1, wherein the first tool comprises an optical inspection tool, and wherein the defect review tool comprises a scanning electron microscope.

7. The method of claim 1, wherein the first tool comprises an electron beam based inspection tool, and wherein the defect review tool comprises a scanning electron microscope.

8. A storage medium comprising program instructions executable on a processor for performing a method for creating a recipe for a defect review process, the method comprising:
   determining an identity of a specimen on which the defect review process will be performed;
   identifying inspection results for the specimen based on the identity, wherein the inspection results have been generated by a first tool;
   determining if a recipe for the defect review process for a layer type of the specimen has been created based on the inspection results;
   if the recipe for the layer type of the specimen has not been created, creating the recipe for the defect review process based on the inspection results without input from a user, wherein the defect review process will be performed by a second tool, and wherein the second tool comprises a defect review tool; and
   storing the recipe such that the recipe can be used for additional specimens having a layer type that is the same as the layer type of the specimen on which the defect review process will be performed.

9. A system configured to create a recipe for a defect review process, comprising:
   a sensor configured to generate output responsive to an identity of a specimen on which the defect review process will be performed; and
   a processor configured to determine the identity of the specimen using the output, to identify inspection results for the specimen based on the identity, to determine if a recipe for the defect review process for a layer type of the specimen has been created based on the inspection results, if the recipe for the layer type of the specimen has not been created, to create the recipe for the defect review process based on the inspection results without input from a user, and to store the recipe such that the recipe can be used for additional specimens having a layer type that is the same as the layer type of the specimen on which the defect review process will be performed, wherein the inspection results have been generated by a first tool, wherein the defect review process will be performed by a second tool, and wherein the second tool comprises a defect review tool.

10. The system of claim 9, wherein the sensor is coupled to a load port of the defect review tool that will perform the defect review process.

11. The system of claim 9, further comprising an additional sensor configured to detect when a carrier containing the specimen is positioned in a load port of the defect review tool, wherein the sensor is further configured to generate the output when the carrier is detected.

12. The system of claim 9, wherein the sensor comprises a bar code reader.

13. The system of claim 9, wherein the processor is coupled to a defect review subsystem such that the processor and the defect review subsystem are configured as the defect review tool.

14. The system of claim 9, wherein the processor is further configured to access the inspection results from a database.

15. The system of claim 9, wherein the first tool comprises an inspection tool, and wherein the processor is coupled to the inspection tool such that the processor can access the inspection results from the inspection tool.

16. The system of claim 9, further comprising a storage medium comprising a look up table, wherein the look up table comprises parameters for the defect review process versus content of the inspection results.

17. The system of claim 9, wherein the first tool comprises an optical inspection tool, and wherein the defect review tool that will perform the defect review process is configured as a scanning electron microscope.

18. The system of claim 9, wherein the first tool comprises an electron beam based inspection tool, and wherein the defect review tool that will perform the defect review process is configured as a scanning electron microscope.

* * * * *